United States Patent [19]
Robertson, Jr.

[11] Patent Number: 4,955,190
[45] Date of Patent: Sep. 11, 1990

[54] METHOD FOR DRIVING A GAS TURBINE UTILIZING A HEXAGONAL PRESSURIZED FLUIDIZED BED REACTOR

[75] Inventor: Archibald S. Robertson, Jr., Whitehouse Station, N.J.

[73] Assignee: Foster Wheeler Development Corporation, Livingston, N.J.

[21] Appl. No.: 437,056

[22] Filed: Nov. 14, 1989

Related U.S. Application Data

[62] Division of Ser. No. 166,573, Mar. 10, 1988, abandoned.

[51] Int. Cl.$^5$ .............................................. F02C 3/28
[52] U.S. Cl. .................................. 60/39.02; 60/39.12
[58] Field of Search ............... 60/39.02, 39.12, 39, 60/464; 110/263; 122/4 D; 431/170

[56] References Cited

U.S. PATENT DOCUMENTS

| | | |
|---|---|---|
| 299,881 | 6/1884 | Topliff et al. . |
| 348,932 | 9/1886 | Rugg . |
| 3,589,342 | 6/1971 | Barker et al. . |
| 3,893,426 | 7/1975 | Bryers . |
| 4,154,197 | 5/1979 | Costello et al. . |
| 4,184,455 | 1/1980 | Talmud et al. . |
| 4,239,479 | 12/1980 | Hodgkin . |
| 4,427,364 | 1/1984 | Bergkvist . |
| 4,479,458 | 10/1984 | Goidich et al. . |
| 4,627,367 | 12/1986 | Butt ...................................... 110/229 |
| 4,761,131 | 8/1988 | Abdulally . |
| 4,802,445 | 2/1989 | Robertson ......................... 60/39.12 |

*Primary Examiner*—Louis J. Casaregola
*Attorney, Agent, or Firm*—Marvin A. Naigur

[57] ABSTRACT

A reactor in which a plurality of vertical panels are disposed in a vessel and are constructed and arranged so as to form three combustion cells. Three of the panels each form a common wall between adjacent cells, and each cell is heated by a fluidized bed. Two of the cells operate as boilers and one as a gasifier. A method of driving a gas turbine utilizing the boilers and the gasifier described above.

5 Claims, 4 Drawing Sheets

METHOD FOR DRIVING A GAS TURBINE UTILIZING A HEXAGONAL PRESSURIZED FLUIDIZED BED REACTOR

This is a divisional of copending application(s) Ser. No. 07/166,573, filed on 03/10/88 (Abandoned).

BACKGROUND OF THE INVENTION

This invention relates to a method of driving a gas turbine and a combined fluidized bed boiler and gasifier disposed in a hexagonal reactor for generating gases to drive the turbine.

Combustion systems utilizing fluidized beds as the primary source of heat generation are well known. In these arrangements, air is passed through a bed of particulate material, including a fossil fuel such as coal and an adsorbent for the sulphur generated by the combustion of the coal, to fluidize the bed and promote the combustion of the fuel at relatively low temperatures. When the combustor is pressurized, the hot gases produced by the fluidized bed can be used to drive a turbine for the generation of electrical power.

One of the characteristics of a fluidized bed combustion bed process is a relatively low gas temperature which is necessary in order to keep the pollutant emissions low. However, this results in a compromise in the combined boiler turbine cycle-efficiency since the turbine can be operated with gas temperatures well in excess of the maximum permitted in a fluidized bed boiler. Hence, in order to increase the temperature of the gas entering the turbine to improve the cycle efficiency, it has been proposed to gasify a slip stream of the fuel feed in a separate vessel. This fuel gas stream is then combined with the flue gasses from the boiler in a burner to raise the temperature of the latter gases to acceptable levels. However, this requirement of an additional gasifier considerably adds to the cost of the process and is thus undesirable.

SUMMARY OF THE INVENTION

It is therefore an object of the present invention to provide a method for generating gases for driving a turbine which eliminates the cost of a separate gasifier.

It is a further object of the present invention to provide a method of the above type in which a multicell fluidized bed boiler is provided which includes a separate gasifier section which generates gases that are partially combusted. The latter gases are discharged from the gasifier and recombined with the flue gases from the boiler and burned in a burner. As a result, the gases attain an elevated temperature consistent with the optimum operation of the gas turbine.

Toward the fulfillment of these and other objects, the reactor of the present invention includes a plurality of panels disposed in a cylindrical vessel and constructed and arranged so as to form three separate cells, with three of the panels each forming a common wall between adjacent cells. A fluidized bed is disposed in each cell and two of the cells operate as standard boilers and the third as a gasifier. According to a preferred embodiment, the panels are formed by water tubes so that water is passed in a heat-exchange relationship to the fluidized beds to convert the water to steam.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawings in which.

DESCRIPTION OF THE PREFERRED EMBODIMENT

Figure 1:
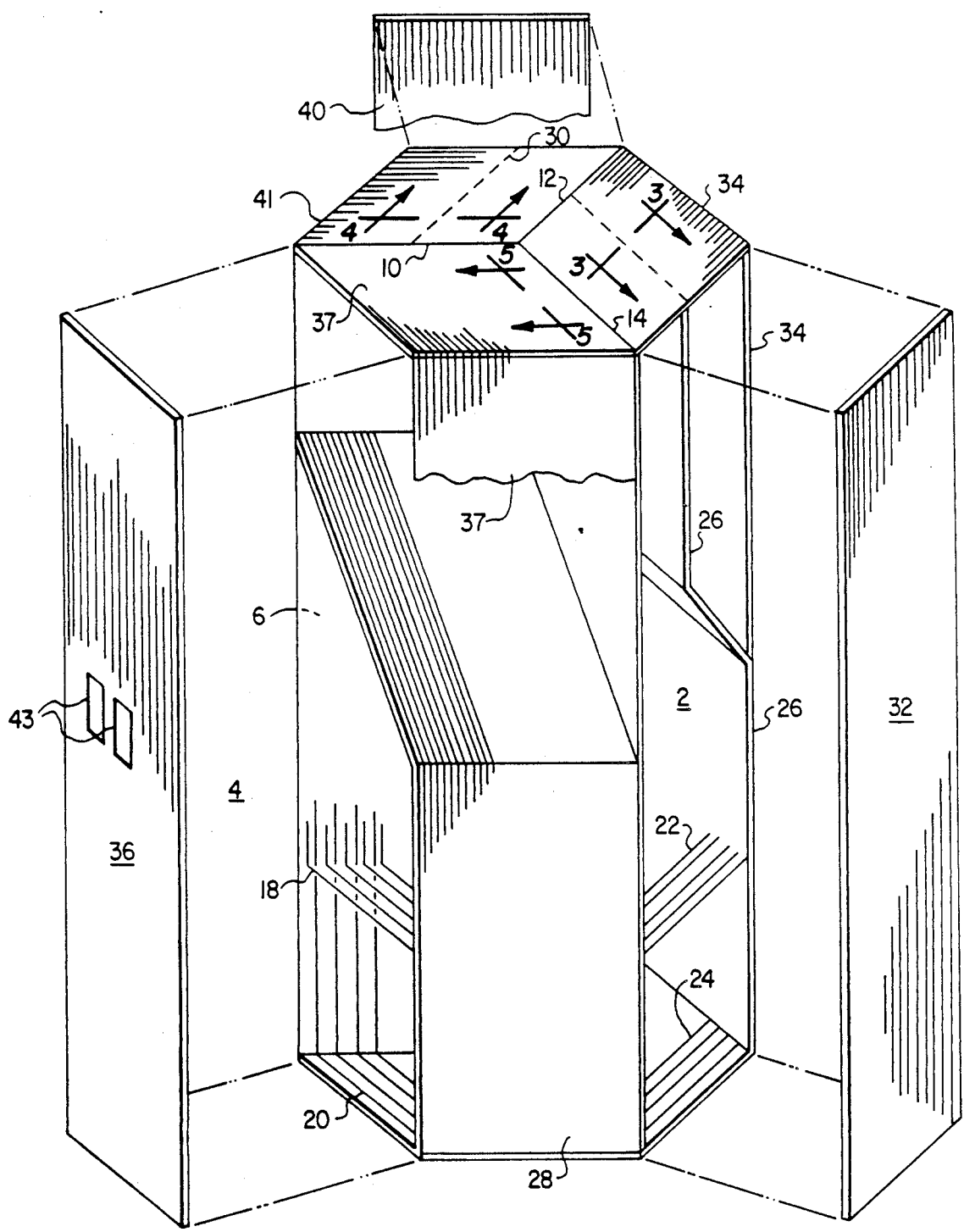
FIG. 1 is an exploded partial perspective view showing a portion of the reactor of the present invention with the water tubes being shown schematically.

Referring to FIG. 1 of the drawings, the reference numeral 1 refers to the reactor of the present invention which includes a series of vertical panels constructed and arranged to form three cells 2, 4 and 6. Three of the panels are shown by reference numerals 10, 12, and 14 and are welded together along their common longitudinal edges at 120° angles relative to each other to form common partitions between the respective cells 2, 4 and 6.

Figure 2:
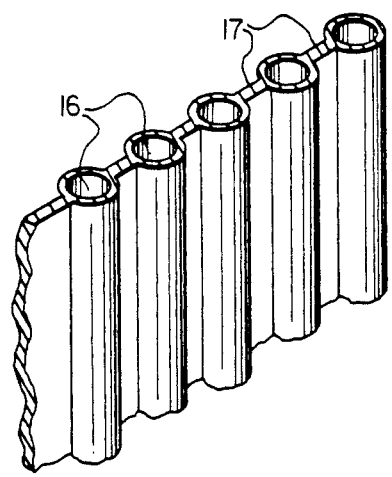
FIG. 2 is an enlarged partial elevational view depicting a portion of a panel according to the present invention.

The panels 10, 12, and 14, as well as the remaining panels depicted in FIG. 1, are formed by a plurality of water tubes as better shown in FIG. 2 of the drawings. More particularly, each panel is made up of a plurality of tubes 16 disposed in a spaced parallel relationship and having two continuous fins 17 extending from diametrically opposed portions thereof with the fins connecting adjacent tubes to form a gas-tight structure.

Referring again to FIG. 1, at the lower portion of the cell 4 half of the tubes 16 forming the panel 10 are bent into a horizontal position to form a water cooled air flow distributor grid 18. The remaining tubes 16 of the panel 10 extend vertically to the lower end of the cell 4 and are bent into a horizontal position to form the floor 20 of the cell 4. The space between the grid 18 and the floor 20 forms an air plenum, as will be discussed in detail later.

In the cell 2, the tubes 16 of the panel 14 are bent in the same manner to form a grid 22 and a floor 24 and air plenum therebetween. Although not clear from FIG. 1, it is understood that the tubes 16 of the panel 12 are bent in the same manner to form a grid and a floor of the cell 6.

Figure 5:
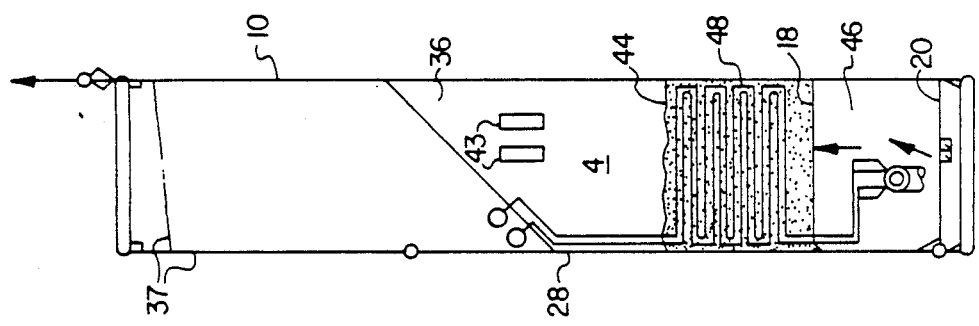
FIGS. 3, 4 and 5 are cross-sectional views taken along the lines, 3—3, 4—4, and 5—5, respectively, of FIG. 1.
Figure 4:
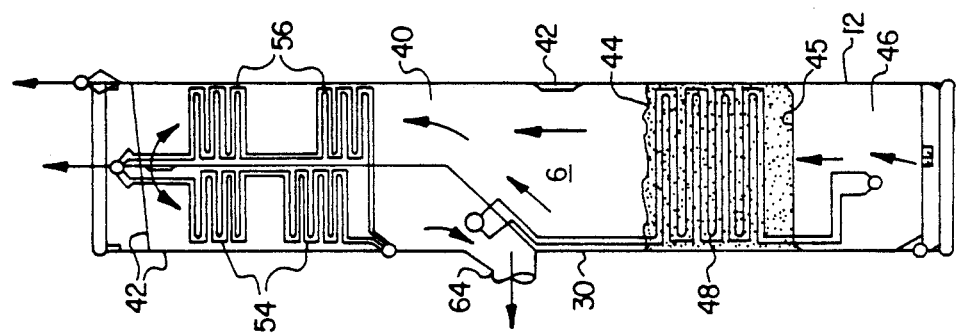
Figure 3:
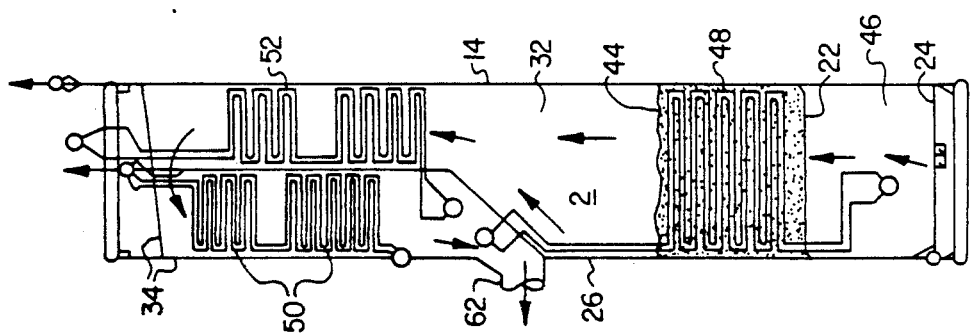

Three sidewall panels 26, 28 and 30 are provided for each cell 2, 4 and 6, respectively. As shown in FIGS. 1 and 3, the panel 26, associated with cell 2, extends upwardly from the floor 24 and is bent inwardly toward the panel 14 and then upwardly to form two narrow chambers. In a similar manner, and as shown in FIGS. 1 and 4, the partition 30 (shown by the dashed lines in FIG. 1) extends upwardly from the floor of the cell 6 and is bent inwardly towards the panel 12, and then upwardly to form two chambers in the upper portion of the cell 6. With reference to FIGS. 1 and 5, the partition 28 extends from the floor of the cell 4 and is bent inwardly towards, and extends to, the panel 10 to form a gasifier cell, as will be described.

A sidewall panel 32 is provided for enclosing the cell 2 and extends vertically for the entire length of the cell. A sidewall/roof panel 34 extends from the bent position of the panel 26 upwardly to enclose one of the narrow chambers formed at the upper portion of the cell 2. The upper end portion of the panel 34 is bent towards the panel 14 to form a roof for the cell 2. The cell 4 is provided with a vertically extending sidewall panel 36 and a sidewall/roof panel 37, and the cell 6 is provided with a vertically extending sidewall panel 40 and a sidewall-/roof panel 41. Since these panels are identical to the panels 32 and 34 of the cell 2, they will not be described in any further detail.

The cross-section of the cells 2, 4, and 6 are thus in the form of equilateral parallelograms extending in a side-by-side relationship, sharing the vertical partition panels 10, 12, and 14, and forming an overall hexagon. As shown in FIG. 4, a plurality of ports 42 are formed in the panel 12 for permitting combustion gases to pass between the cells 2 and 6 as will be described in detail later. The latter ports can be formed by bending selected tubes 16 out of the plane of the panel 12. A plurality of ports 43 (FIGS. 1 and 5) are formed through the panel 36 to allow the gases formed in the cell 4 to discharge to external equipment as will be described.

Referring to FIGS. 3, 4 and 5, a bed of particulate material, shown in general by the reference numeral 44, is disposed within each cell 2, 4 and 6 and rests on the grids of the cells 2, 4 and 6. The grids of the cells 4 and 2 are shown by the reference numerals 18 and 22, respectively in FIGS. 1, 3 and 5, and the grid of the cell 6 is shown by the reference numeral 45 in FIG. 4. Each bed 44 can consist of a mixture of discrete particles of fuel material such as bituminous coal, and an adsorbent, such as dolomite, for absorbing the sulfur released by the combustion of the fuel material. It is understood that appropriate feeders (not shown) can be provided for feeding additional coal and adsorbent to the beds.

As mentioned above, an air plenum is provided between the floor and the grid of each cell 2, 4 and 6 as shown by the reference numeral 46, for distributing pressurized air from an external source (not shown) through the openings in the grid. This air thus passes into each bed 44 for providing air for combustion of the fuel and for fluidizing the particulate material.

A tube bundle, shown in general by the reference numeral 48, is disposed in the lower portion of each cell 2, 4 and 6 and extends within the fluidized bed 44 disposed in each cell. Each tube bundle 48 is formed by a plurality of spaced parallel tubes disposed in a serpentine relationship and connected to appropriate inlet and outlet headers as shown, to provide for circulation of water or steam through the fluidized bed for heating same as will be described in detail later.

Referring specifically to FIG. 3, a pair of additional tube bundles 50 and 52 are respectively disposed in the upper chambers of the cell 2. As shown in FIG. 4, a pair of additional tube bundles 54 and 56 are respectively disposed in the upper chambers of the cell 6. The tube bundles 48, 50, 52, 54 and 56 are connected to appropriate inlet headers and outlet headers as shown and to downcomers (not shown) in order to provide for the flow of the fluid to be heated and thus serve to preheat, superheat and reheat the fluid as will be described. Since these inlet and outlet headers and their connections to the respective tube bundles are conventional, they will not be described in any further detail.

Figure 6:
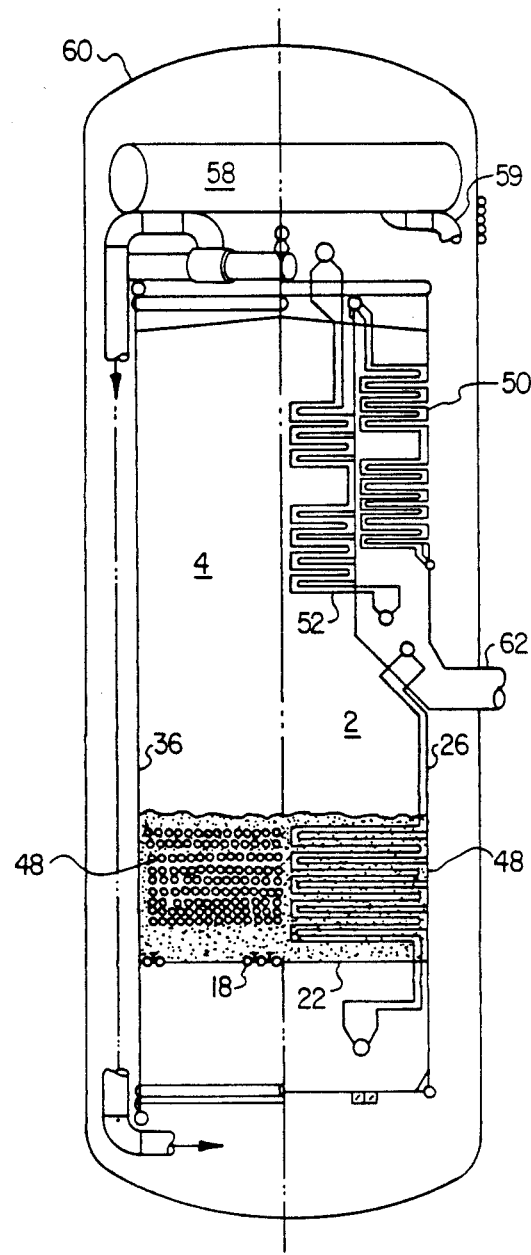
FIG. 6 is an elevational view depicting the reactor of FIG. 1.

FIG. 6 of the drawings depicts the cells 2 and 4 with the panels 32 and 37 removed for the convenience of presentation. The reference numeral 58 refers in general to a steam drum which is connected in the aforementioned fluid flow circuit which includes a downcomer 59 adapted to receive a steam-water mixture from the flow circuit and separate same into steam and to water, as will be described. An insulated cylindrical vessel 60 encloses the cells 2, 4, and 6 the steam drum 58, and the associated flow circuitry, with the aforementioned unique configuration of the combustion cells fitting within the cylindrical vessel 60 with a minimum of lost space. It is understood that the steam drum 58 can be located outside the vessel 60 instead of inside as shown. Two outlets 62 (FIGS. 3 and 6) and 64 (FIG. 4) extend through the vessel 64 and register with an upper chamber of the cells 2 and 6, respectively, for reasons to be explained.

Figure 7:
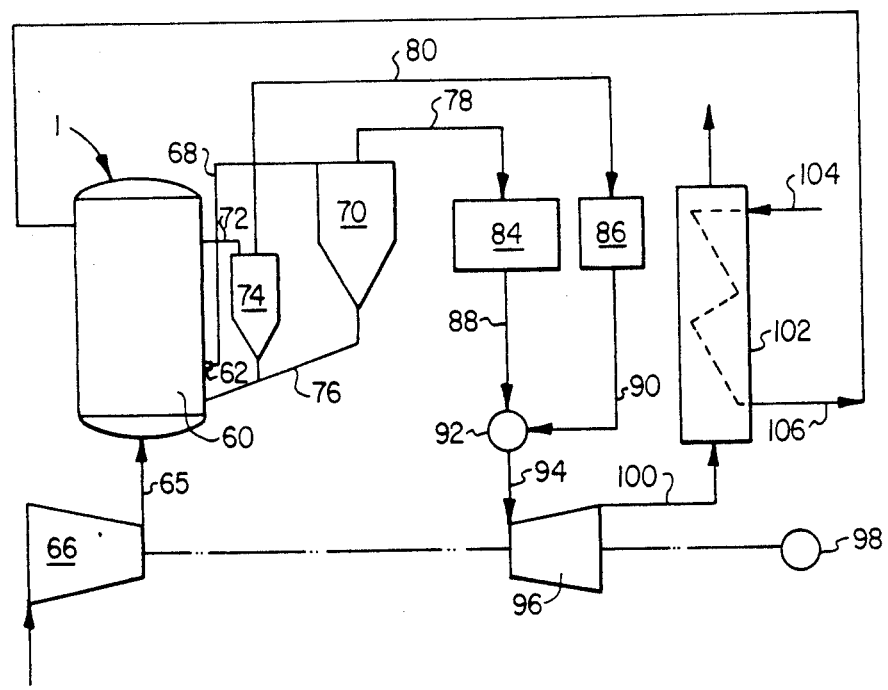
FIG. 7 is a schematic view of the reactor of FIGS. 1-6 shown connected to auxiliary equipment utilized in the method of the present invention.

FIG. 7 of the drawings depicts the reactor 1 of the present invention installed relation to other equipment for performing the method of the present invention. A conduit 65 is provided which introduces air into the lower portion of the vessel 60 for passing through the cells 4, 2 and 6, respectively. An air compressor 66 operates in a conventional manner to supply pressurized air to the conduit 65. Although not shown in the drawings, it is understood that one or more feeders, or the like, are provided to introduce additional fuel and adsorbent material into the beds 44 of each cell 2, 4 and 6 as needed and also provided are one or more extraction units so that solid products do not accumulate in the bed.

The gaseous products of combustion from the beds 44 in the cells 2 and 6 combine with the air introduced via the conduit 65 to form a flue gas that passes through the length of each of the latter cells before exiting via the outlets 62 and 64, respectively. The gases from the outlet 62 pass into a conduit 68 which is connected to the inlet of a cyclone separator 70. Although not shown in the drawings, it is understood that a conduit connects the outlet 64 of the cell 6 to the conduit 68 for passing the gases from the cell 6 to the separator 70. It is also understood that a conduit 72 is connected to the ports 43 in the panel 36 to receive gases produced in the cell 4 and to discharge the gases into a second cyclone separator 74.

The solid particles separated from the gases in the separators 70 and 74 are discharged from their lower portions thereof into a conduit 76 which re-injects the particles material through a suitable inlet in the vessel 60 and back into the bed 2. The separated gases from the separators 70 and 74 pass, via conduits 78 and 80, respectively, into two clean-up units 84 and 86, respectively, for effecting additional separation of any impurities or solid particles from the gases.

Two conduits 88 and 90 respectively connect the clean-up units 84 and 86 to a burner assembly 92 which functions in a conventional manner to ignite the gases in the presence of excess air in conduit 88 and therefore produces a product gas which is fed, via a conduit 94, to a gas turbine 96.

The gas turbine 96 drives an electrical generator 98 in a conventional manner, and the gas outlet of the turbine is connected, via a conduit 100, to a waste heat boiler 102. Feedwater from a conduit 104 enters the upper portion of the waste heat boiler 102 and traverses the length of the boiler and is thus heated before passing, via a conduit 106, to the tube bundles 50 and 52 in the upper chambers of the cell 2 to superheat the steam. The superheated steam from the bundles 50 and 52 is directed to other equipment for further use.

In operation, air from the compressor 66 is passed, via the conduit 65, into the air plenums 46 of each cell 2, 4, and 6, and through the respective grids 18, 22 and 45 of the latter cells. The air can be evenly or selectively distributed through the bed of each cell 2, 4 and 6 to fluidize the particulate material in any preferred operating mode. The velocity of the air thus introduced is sufficient to fluidize the beds 44 and promote the combustion of the particulate fuel material in each bed. The amount of air introduced to the cells 2 and 6 is sufficient to completely combust the fuel in the beds 44 of these cells, while the amount of air introduced to the cell 4 is insufficient to combust the fuel in the bed 44 of the latter cell but sufficient to generate a combustible off-gas.

The gaseous products of combustion in the cells 2 and 6 combine with the air introduced to the cells in the foregoing manner to form a flue gas that passes upwardly through the length of each cell and over the tube bundles 52 and 58, respectively. The flue gas is then directed downwardly in the cells 2 and 6 before passing over the tube bundles 50 and 56 and exiting from the outlets 62 and 64 respectively. The gases then pass, via the conduit 68, to the separator 70. During this passage, the flue gas entrains the relatively fine particulate material from the beds 44 in each of the cells 2 and 6.

The off-gas from the cell 4 discharges from the ports 43 in the panel 36 and into the conduit 72 and is thus passed into the separator 74.

The gases in the separators 70 and 74 are separated from their entrained particulate material and the latter is reinjected, via the conduit 76, back into the bed 44 in the cell 2. The relatively clean gases from the separators 70 and 74 pass, via the conduits 78 and 80, into the clean-up units 84 and 86, respectively, for further clean-up, and the relatively pure gases then pass, via the conduits 88 and 90, into the burner assembly 92. At the burner assembly 92, combustion of the combustible off-gas from the cell 4 is achieved in the presence of the flue gas and excess air in the conduit 88 to raise the temperature of the gases before they pass, via the conduit 94, into the gas turbine 96.

The spent gases from the turbine pass, via the conduit 100, into the waste heat boiler 102 and exchange heat with feedwater passing through the latter boiler from the conduit 94. The heated feedwater from the boiler 102 passes, via the conduit 106, into the cell 6 of the reactor 1 and through the tube bundle 48 in the bed 44 of the latter cell which functions as an economizer and preheats the feedwater before it is directed, again by appropriate piping, headers, etc., to the steam drum 58. Saturated water from the steam drum 58 is directed to recirculation pumps (not shown) positioned outside the pressure vessel. The water is then pumped through parallel evaporation circuits which consist of the tubes forming the above mentioned panels, or walls, along with the tube bundles 54 and 56 in the upper chambers of the cell 6. The steam-water mixture leaving the latter circuits is then directed to the steam drum 58 which is equipped with horizontal steam separators and chevron dryers (not shown) in a conventional manner.

Dry saturated steam from the steam drum 58 is passed through the tube bundle 48 disposed in the fluidized bed 44 associated with the cell 4 before it is directed to the tube bundle 48 in the cell 2 and then to the tube bundle 52 in the other upper chamber of the cell 2 for final superheat. The final main steam temperature can be controlled by dampers used in conjunction with the ports 42 in the common wall 12, and it is understood that steam by-pass lines may be provided around the tube bundles 48 in the cells 2 and 4 as required for unit turndown.

Reheat steam discharged from the high pressure steam turbine is initially heated in the tube bundle 50 associated with the upper chamber of the cell 2. It is understood that an additional tube bundle 48 (not shown) can be provided in the cell 2 to heat the reheat steam to a final desired temperature.

Several advantages result from the method and apparatus of the present invention. For example, the fluidized beds in the cells 2 and 6 with the inherent advantages discussed above, are utilized and are operated at the optimum temperature of 1600° F. while eliminating the need for utilizing a separate gasifier to raise the temperature of the gases to the requisite temperature required by the turbine 96. This, of course, is achieved by generating the combustible off-gas in the cell 4 and utilizing this gas to raise the temperature of the flue gases exiting from the boiler. Thus, a relatively efficient operation is achieved. Also the hexagonal bed cross-section of the present arrangement enables a pressure vessel 60 with a smaller diameter to be used as compared to a square bed cross-section yet permits the fuel gas generating unit, or gasifier, in the cell 4, to be placed in the same vessel with the two separate boilers formed in the cells 2 and 6, thus representing a major savings in vessel cost. Just as important, the hexagonal design of the present invention can achieve this savings using conventional steam generator pressure parts, i.e., flat welded panels, flat tube bundles and straight headers. Also according to the present invention, the use of multiple beds 44 permit location of steam generation and/or economizer heat transfer surfaces in a separate cell to insure adequate tube cooling during start-up before steam flow is established in the super-heater and reheater tubes.

Further the ports 42 provided in the common wall 12 enable the combustion exhaust gases from each of the unit's two independent boiler cells 2 and 6 to be mixed and caused to flow via external dampers over the upper chamber tube bundles 50, 52, 54 and 56 in selectively preferred distributions. Thus, by allocating specific duty functions, i.e., either steam generation, superheat, or reheat to these upper chamber tube bundles the unit can maintain superheat and reheat steam temperatures at desired levels over a greatly extended operating range without the need to reduce bed heights or stop the combustion process in either of the cells 2 and 6. Still further, the reduced cross-sectional area of the convection heat transfer surfaces in the upper chambers associated with the cells increases the innertube gas velocities and therefore the heat transfer rates.

It is understood that several other variations in the foregoing can be made without departing from the scope of the invention. For example, the reactor 1 of the present invention could be operated with supercritical pressure, thus eliminating the need for the steam drum 58 and its associated fluid flow circuitry. Depending upon the amount of fluid to be heated, the exhaust gas temperatures desired, and the type of fluidization desired i.e. "bubbling" versus "fast", tube bundles 48, 50, 52, 54, and 56 may be deleted selectively or in their entirety. Furthermore if bundles 50 and 54 are chosen not to be provided, the downflow portion of the upper chambers of cells 2 and 4 can be eliminated to make room for the inclusion of the cyclone separator(s) 70 within vessel 60. Similarly, the cyclone separator 74 can be affixed to cell 4 within the same vessel 60. By placing cyclone separators 70 and 74 within vessel 60 an even further reduction in plant costs and increased efficiency can be achieved.

Figure 8:
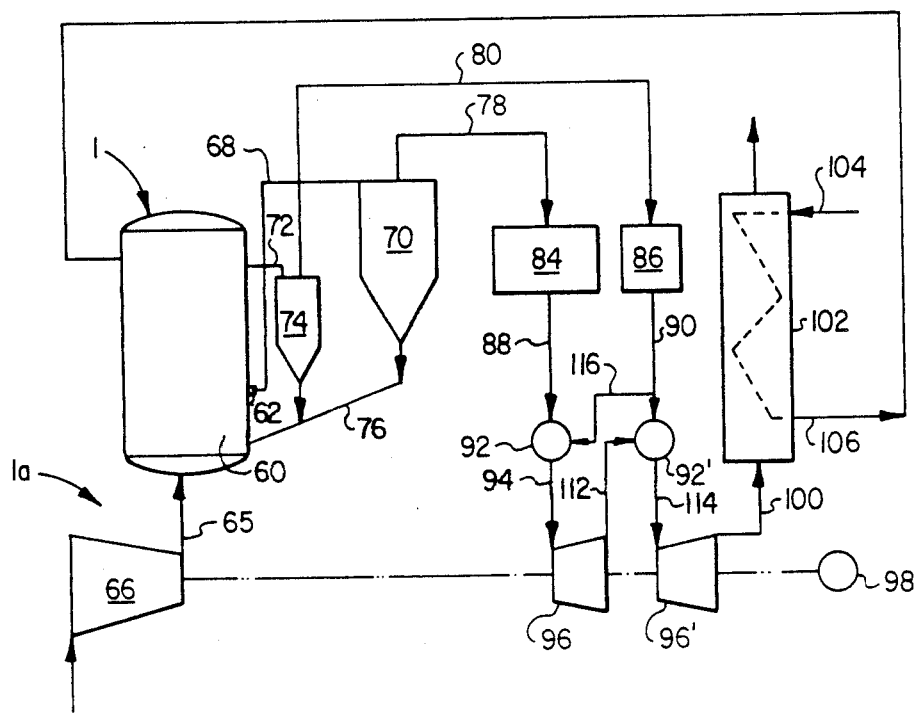
FIG. 8 is a view similar to FIG. 7, but depicting an alternate arrangement of the equipment of FIG. 7.

Since the embodiment of FIG. 8 is similar to that of FIG. 1 and utilizes the same components as in the embodiment of FIG. 1 these components will be given the same reference numerals. According to the embodiment of FIG. 2 a second-stage turbine 96' provided in series relationship with the first-stage turbine 96, and two burners 92 and 92' are connected, via the conduits 88 and 90, to the clean-up units 84 and 86, respectively. A conduit 112 connects the gas outlet of the first-stage turbine 96 to the burner 92', and a conduit 114 connects the burner 92' to the second stage turbine 96'. A conduit 116 is provided for routing a portion of the gases from the clean-up device 86 to the burner 92 as in the previous embodiment.

Thus, according to the embodiment of FIG. 8, the gases from the first-stage turbine 96 pass through the conduit 112, the burner 92', the conduit 114 and into the second-stage turbine 96', and the spent gases from the latter pass, via the conduit 100, to the waste heat boiler 102. Otherwise the operation and function of the embodiment of the FIG. 8 is identical to that of FIG. 7.

It is understood that the fluidized bed boilers 2 and 6 can be of a "bubbling" type or a "fast" type. In the bubbling type the combustion supporting air causes the material to expand and take on a suspended, or fluidized, state. The gas velocity is typically two to three times that needed to develop a pressure drop which will support the bed weight (e.g., minimum fluidization velocity), causing the bed to exhibit a well-defined upper surface and the formation of bubbles that rise up through the bed and give it the appearance of a boiling liquid.

In a "fast" fluidized bed the mean gas velocity, as a fraction of the minimum fluidizing velocity, is increased above that for the bubbling bed, so that the bed surface becomes more diffused and the solids entrainment from the bed is increased. According to this process, fluidized bed densities between 5 and 20% volume of solids are attained which is well below the 30% volume of solids typical of the bubbling fluidized bed. The formation of the low density fast fluidized bed is due to its small particle size and to a high solids throughput, which require high solids recycle. The velocity range of a fast fluidized bed is between the solids terminal, or free fall, velocity and velocity beyond which the bed would be converted into a pneumatic transport line.

The high solids circulation required by any circulating fluidized bed makes it insensitive to fuel heat release patterns, thus minimizing the variation of the temperature within the steam generator, and therefore decreasing the nitrogen oxides formation. Also, the high solids loading improves the efficiency of the mechanical device used to separate the gas from the solids for solids recycle. The resulting increase in sulphur adsorbent and fuel residence times reduces the adsorbent and fuel consumption.

Other modifications, changes and substitutions are intended in the foregoing disclosure and, in some instances, some features of the invention can be employed without a corresponding use of other features. Accordingly, it is appropriate that the appended claims be construed broadly and in a manner consistent with the scope of the invention therein.

What is claimed is:

1. A method of operating a gas turbine comprising the steps of forming three separate combustion cells in a single vessel, forming a bed of particulate material including fuel in each of said cells, passing air through each of said beds, the quantity of air passed through two of said cells being sufficient to fluidize said particulate material in their respective beds and promote the combustion of said fuel, and the quantity of said air passed to the other of said cells being insufficient for complete combustion of said fuel but sufficient to generate a combustible off-gas, the flue gases from the combustion in said two cells passing through the length of said two cells and entraining a portion of said particulate material before discharging from an outlet in said vessel; discharging said off-gas from another outlet of said vessel, separating the entrained particulate material from said flue gases and from said off-gas, burning said separated off-gas in the presence of said flue gases to raise their temperature, and passing said high temperature gases to a turbine.

2. The method of claim 1 wherein there is one burner and where said flue gases and said off-gas are passed to said burner.

3. The method of claim 1 wherein there are two burners and wherein said flue gases are passed to one burner and said off-gas is passed to the other burner.

4. The method of claim 3 wherein the respective gases from said burners are respectively passed to a first stage and a second stage turbine.

5. The method of claim 1 further comprising the step of exchanging heat between the spent gases from said turbine and feedwater to raise the temperature of the feedwater, and passing the feedwater to at least one of said cells to convert said heated feedwater to steam.

* * * * *